United States Patent
Kumar et al.

(10) Patent No.: US 10,250,383 B1
(45) Date of Patent: Apr. 2, 2019

(54) DYNAMIC DOMAIN KEY EXCHANGE FOR AUTHENTICATED DEVICE TO DEVICE COMMUNICATIONS

(71) Applicant: MOCANA CORPORATION, Sunnyvale, CA (US)

(72) Inventors: Srinivas Kumar, Cupertino, CA (US); Atul Gupta, Sunnyvale, CA (US); Pramod Malibiradar, Sunnyvale, CA (US); Shreya Uchil, Millbrae, CA (US)

(73) Assignee: MOCANA CORPORATION, Sunnyvale, CA (US)

( * ) Notice: Subject to any disclaimer, the term of this patent is extended or adjusted under 35 U.S.C. 154(b) by 0 days.

(21) Appl. No.: 16/138,030

(22) Filed: Sep. 21, 2018

Related U.S. Application Data

(60) Provisional application No. 62/645,263, filed on Mar. 20, 2018.

(51) Int. Cl.

| | | |
|---|---|---|
| *H04L 29/06* | (2006.01) |
| *H04L 9/08* | (2006.01) |
| *H04L 9/32* | (2006.01) |
| *H04W 4/06* | (2009.01) |
| *H04L 29/08* | (2006.01) |
| *H04W 12/06* | (2009.01) |
| *H04W 4/40* | (2018.01) |

(52) U.S. Cl.
CPC .......... *H04L 9/0825* (2013.01); *H04L 9/3268* (2013.01); *H04L 67/12* (2013.01); *H04W 4/06* (2013.01); *H04W 4/40* (2018.02); *H04W 12/06* (2013.01)

(58) Field of Classification Search
None
See application file for complete search history.

(56) References Cited

U.S. PATENT DOCUMENTS

| 9,954,851 B2* | 4/2018 | Ahn ................ H04L 63/0823 |
| 2005/0198170 A1* | 9/2005 | Lemay ................ H04L 63/045 |
| | | 709/206 |
| 2007/0223702 A1* | 9/2007 | Tengler ................ H04L 9/3263 |
| | | 380/270 |
| 2009/0037736 A1* | 2/2009 | Djordjrvic ............ H04L 63/062 |
| | | 713/170 |

(Continued)

FOREIGN PATENT DOCUMENTS

KR   2017134804 A   * 12/2017   ........... H04L 9/0819

*Primary Examiner* — Michael R Vaughan
(74) *Attorney, Agent, or Firm* — Buchanan Ingersoll & Rooney PC

(57) ABSTRACT

A method of dynamically generating a domain based public group key and private member keys using a domain key agent, a domain key service of a domain key broker, and a domain key distribution center. The method includes: sending to the domain key service of a domain key broker a request for a private member key for the domain, wherein the request includes proof of possession of a vehicle private key associated with a vehicle certificate and a vehicle public key; receiving from the domain key service a private member key and a public group key; sending a message digitally signed using the member private key; verifying the digital signature on the received message using the public group key; and dynamically renewing the public group key and private member key based on the domain.

4 Claims, 9 Drawing Sheets

(56) References Cited

U.S. PATENT DOCUMENTS

| | | | | |
|---|---|---|---|---|
| 2012/0311328 A1* | 12/2012 | Wang | .................... | H04W 12/06 |
| | | | | 713/168 |
| 2013/0121492 A1* | 5/2013 | Vacon | ................... | H04W 12/06 |
| | | | | 380/270 |
| 2016/0112206 A1* | 4/2016 | Cizas | .................... | H04L 9/3263 |
| | | | | 713/158 |
| 2017/0346640 A1* | 11/2017 | Smith | ....................... | H04L 9/14 |
| 2018/0006829 A1* | 1/2018 | Kravitz | ................ | H04L 9/3255 |
| 2018/0332014 A1* | 11/2018 | Kravitz | .................. | H04L 9/006 |

* cited by examiner

DYNAMIC DOMAIN KEY EXCHANGE FOR AUTHENTICATED DEVICE TO DEVICE COMMUNICATIONS

FIELD

This disclosure relates to the field of inter device communications for the Internet of Things (IoT) based on issuance of cryptographic artifacts by a group broker based on identity proofing and cryptographically signed messages for communications between group members.

BACKGROUND

The emerged Internet of Things (IoT) and emerging device to device communications for information exchange and data sciences requires a platform for dynamic cross domain authentication and exchange of cryptographic artifacts for data integrity. Further, authentication must be based on proof of identity and proof of possession of a secret to trusted sessions based on anonymity for privacy. Identity of an entity, such as for example a person, device, application or service is predicated today on an identity provider and authenticator associated with a domain. Multi domain authentication is based on security assertions (or claims) issued by an identity provider to a service provider. With billions of IoT enabled heterogeneous systems (for example, vehicles, medical devices, manufacturing systems, process control systems, consumer electronics, mobile devices, etc.), current authentication methods are difficult to provision, administer, maintain and operate. Further, centralized management of IoT devices is not viable. Therefore there is a need for a decentralized, distributed and dynamic mechanism to authenticate a IoT device.

SUMMARY

The proposed method uses autonomous domains for group based dynamic membership. The Public Key Infrastructure (PKI) is leveraged to generate a group public key and multiple member private keys for dynamic enrollment in the permissioned domain. The enrollment duration may be limited through certificates issued to member keys and permissions based on member attributes. The domain may also be regarded as an encryption realm.

The Domain Key Agent on the vehicle discovers a Domain Key Broker for the current domain and requests the group public key and member private key for the domain. The immutable vehicle identity and vehicle certificate is used for vehicle authentication with privacy protection. The vehicle certificate may be issued by, and managed by, the vehicle manufacturer and includes a vehicle public key. Further, the public key is associated with a vehicle private key—namely a PKI one-to-one (non-group) public-private key pair, distinct from the one-to-many group PKI. The Domain Key Agent on the vehicle acts as a proxy for applications on components within the vehicle, such as for example an Electronic Control Unit (ECU), Telematic Control Unit (TCU), OnBoard Diagnostics (OBD), Secure Gateway, In-Vehicle Infotainment (IVI), etc. Components on a vehicle may communicate with components on another vehicle (for vehicle to vehicle communications) or to infrastructure services (for vehicle to infrastructure communications). Messages may be signed using the member private keys, and verified using the group public key for the domain.

As a vehicle transits through domains, the domain key agent acquires the domain key pairs dynamically from a dynamically discovered Domain Key Broker for the domain. The Domain Key Agent may store domain artifacts, such as for example keys, certificates, Wi-Fi service set identifier (SSID) information, etc. in a Domain Keystore on the vehicle. The SSID may be based on, as an example, geo-location, city or zip code, among other common data points.

The Domain Key Broker may store transactions in a local database and dispatch events to a distributed ledger as a network peer of a blockchain service. The Domain Key Broker may communicate with a configured Domain Key Factory Service to retrieve information about adjacent domain key brokers, enrollment services for certificate lifecycle management, or domain group and member key issuers.

In exemplary embodiments of the present disclosure, the methods may be applied in the field of peer to peer communications between systems or machines for inter-system or machine to machine communications.

The Domain Key Factory Service of the Domain Key Distribution Center may employ a plurality of methods to generate cryptographic keys. Public Key Infrastructure (PKI) base asymmetric key-pairs comprising of a single group public key and multiple member private keys for a domain may be generated leveraging technologies such as for example Intel® Enhanced Privacy ID (EPID). Alternate methods may include use of symmetric pre-shared secrets such as the Key Encryption Key (KEK) and Traffic Encryption Key (TEK) specified in the Group Domain of Interpretation (GDOI) standards described in Request for Comments (RFC) 3547 and 6407 (published by The Internet Society, Network Working Group).

BRIEF DESCRIPTION OF THE DRAWINGS

The disclosure is best understood from the following detailed description when read in connection with the accompanying drawings. According to common practice, various features/elements of the drawings may not be drawn to scale. Common numerical references represent like features/elements. The following figures are included in the drawings.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

In an exemplary embodiment of the present disclosure, establishment of cryptographic artifacts for communications between any two devices (for example, vehicles, or machines) requires an authentication phase and a key exchange phase to occur between a domain key agent on the device and a domain key broker for the domain. During the authentication phase, the device provides a certificate for identification purposes and advanced proof of possession of an associated secret. During the key exchange phase, cryptographic keys and a member certificate for the domain may be generated and exchanged.

Figure 1:
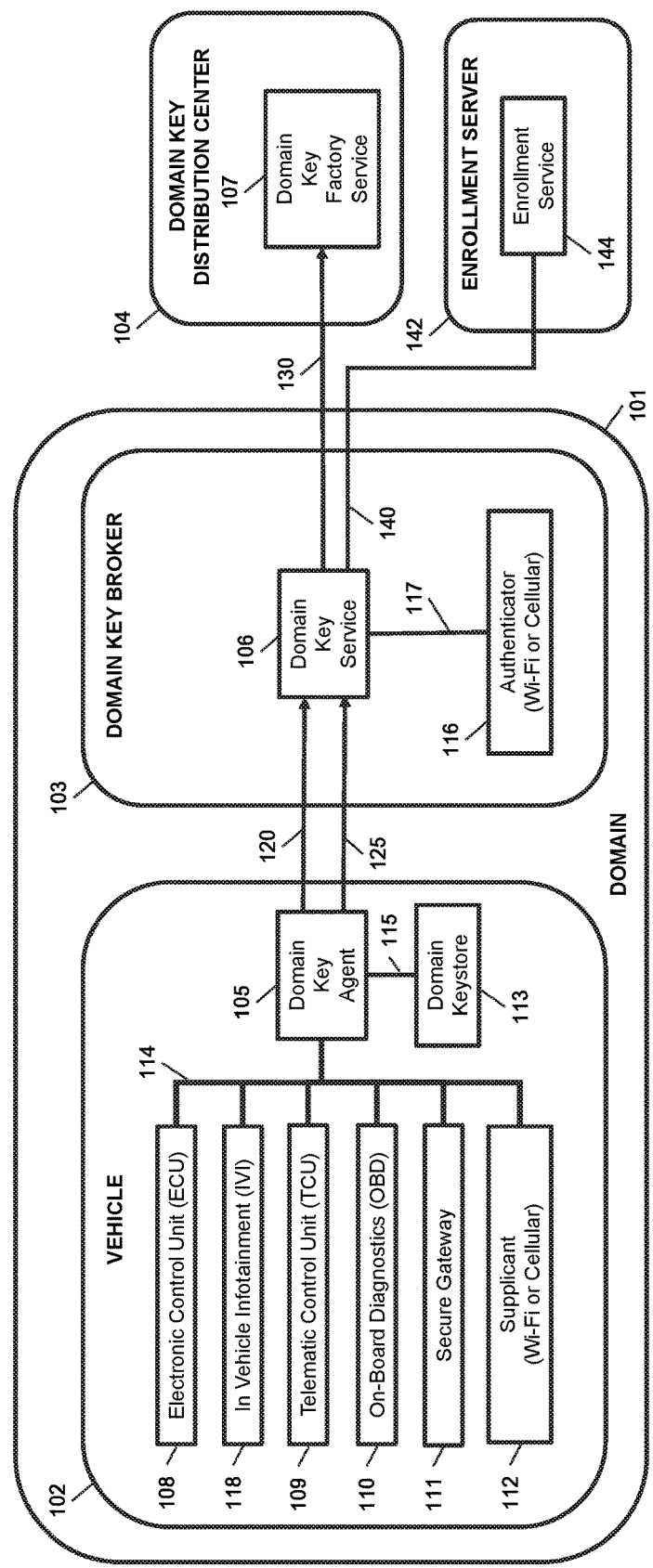
FIG. 1 is a graphical representation of a domain key agent, a domain key broker for the domain, and a domain key distribution center, in accordance with various exemplary embodiments of the disclosed system.
Figure 2:
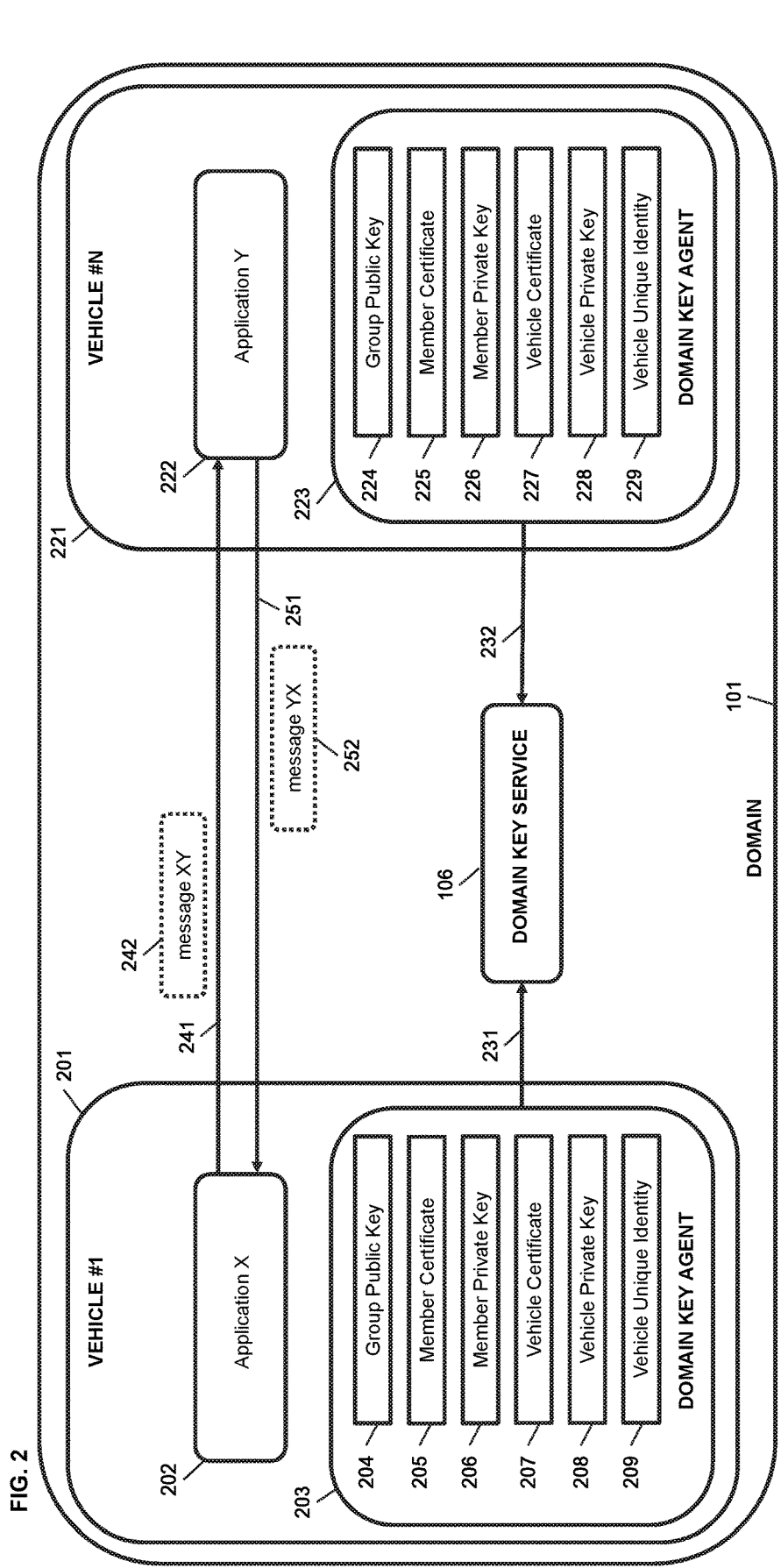
FIG. 2 is a schematic diagram illustrating a method to use a domain key service for integrity of messages exchanged between applications in accordance with various exemplary embodiments of the disclosed system.

Referring to FIG. 1 and FIG. 2, on a vehicle 102 in domain 101, at step 114 components on the vehicle, such as an Electronic Control Unit (ECU) 108, In Vehicle Infotainment (IVI) 118, a Telematic Control Unit (TCU) 109, On-Board Diagnostics (OBD) 110, a Secure Gateway (111) or a Wi-Fi or Cellular Supplicant 112 may perform data transfer over a communication media such as for example a Controller Area Network (CAN) Bus, Local Interconnect Network (LIN), Flex Ray (FR) or Ethernet Network. The components on the vehicle may exchange (send and/or receive) messages from components on other vehicles, using the domain key agent 105 as a proxy service. At step 120, the supplicant 112 authenticates with a domain key service 106 on a domain key broker 103 in domain 101 over a Wi-Fi or cellular network. At step 117 the authenticator 116 on the domain key broker 103 authenticates the supplicant 112 based on a configured authentication method, such as for example a vehicle certificate 207 and a vehicle unique identity 209. At step 125, the domain key agent 105 may request a PKI key pair (the group public key 204, a member private key 206 and a member certificate 205) from the domain key service 106. At step 130 the domain key service 106 may communicate with a domain key factory service 107 on a domain key distribution center 104 to generate a member private key 206 for the vehicle 102. At step 140, the domain key service 106 may communicate with an enrollment service 144 on an enrollment server 142 to generate a member certificate 205 associated with the group public key 204. The member certificate 205 serves as a means to expire the public group key 204 on certificate expiry to force a request for a new PKI key pair from the domain key service 106.

In an exemplary embodiment of the proposed system, the domain key distribution center 104, and the enrollment server 142 may provide services to multiple domains.

Referring to FIG. 2, vehicle #1 201 and vehicle #N 221 are respectively in possession of an immutable vehicle unique identity (209, 229), a vehicle private key (208, 228), and a vehicle certificate (207, 227) issued for the associated vehicle public key. At steps 231 and 232, the domain key agents (203, 223) respectively communicate with the domain key service 106 to retrieve the group public key (204, 224), member certificate (205, 225) and member private key (206, 226) for domain 101. At step 241, application X (202) of vehicle #1 (201) sends a message XY (242) to application Y (222) on vehicle #N (221). The transmitted message XY (242) is digitally signed using the member private key (206) for domain 101. The received message XY (242) is verified using the group public key (224) for the domain 101 by application Y (222). At step 251, application Y (222) of vehicle #N (221) sends a message YX (252) to application X (202) on vehicle #1 (201). The transmitted message YX (252) is digitally signed using the member private key (226) for the domain 101. The received message YX (252) is verified using the group public key (204) for domain 101 by application X (202). Within a domain (e.g. domain 101), the group public keys 204 and 224 are the same and provides secure signing and verification of messages for integrity with privacy for members.

Figure 3:
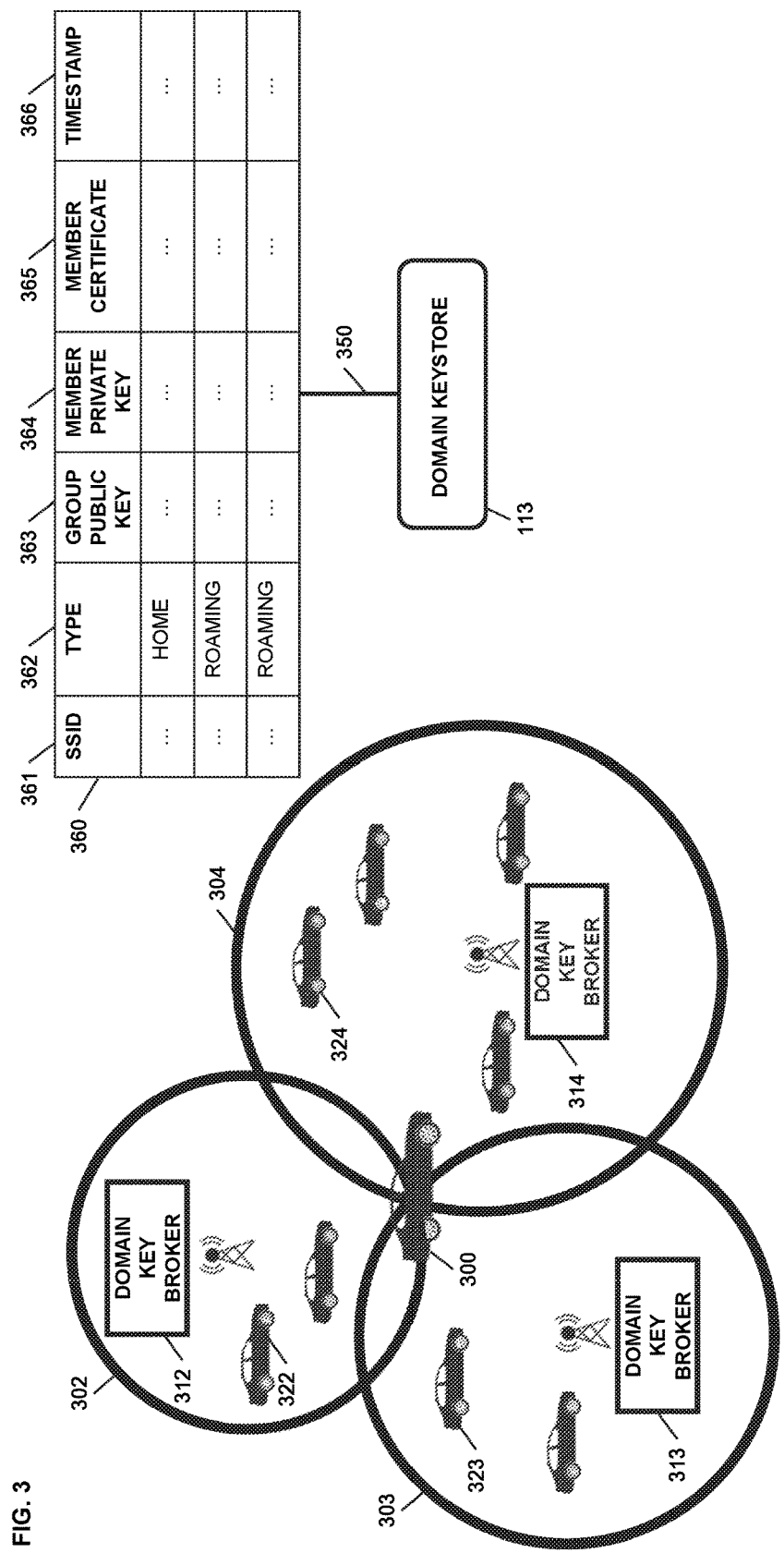
FIG. 3 is a schematic diagram illustrating a method of dynamically rekeying with a domain key broker in accordance with various exemplary embodiments of the disclosed system.

Referring to FIG. 3, domains 302, 303 and 304 represent three adjacent domains. The vehicle 300 traverses these domains and communicates with the respective domain key brokers 312, 313 and 314 to request domain specific group public keys, member certificates and member private keys. The vehicle 300 communicates using the group public key 363, member certificate 364 and member private key 365 based on the current domain, determined at step 350 by SSID (361), type 363, and precedence order configured in table 360 of the local domain keystore 113. The timestamp 366 for entries in table 360 may determine the most recently traversed domains by SSID 361.

Figure 4:
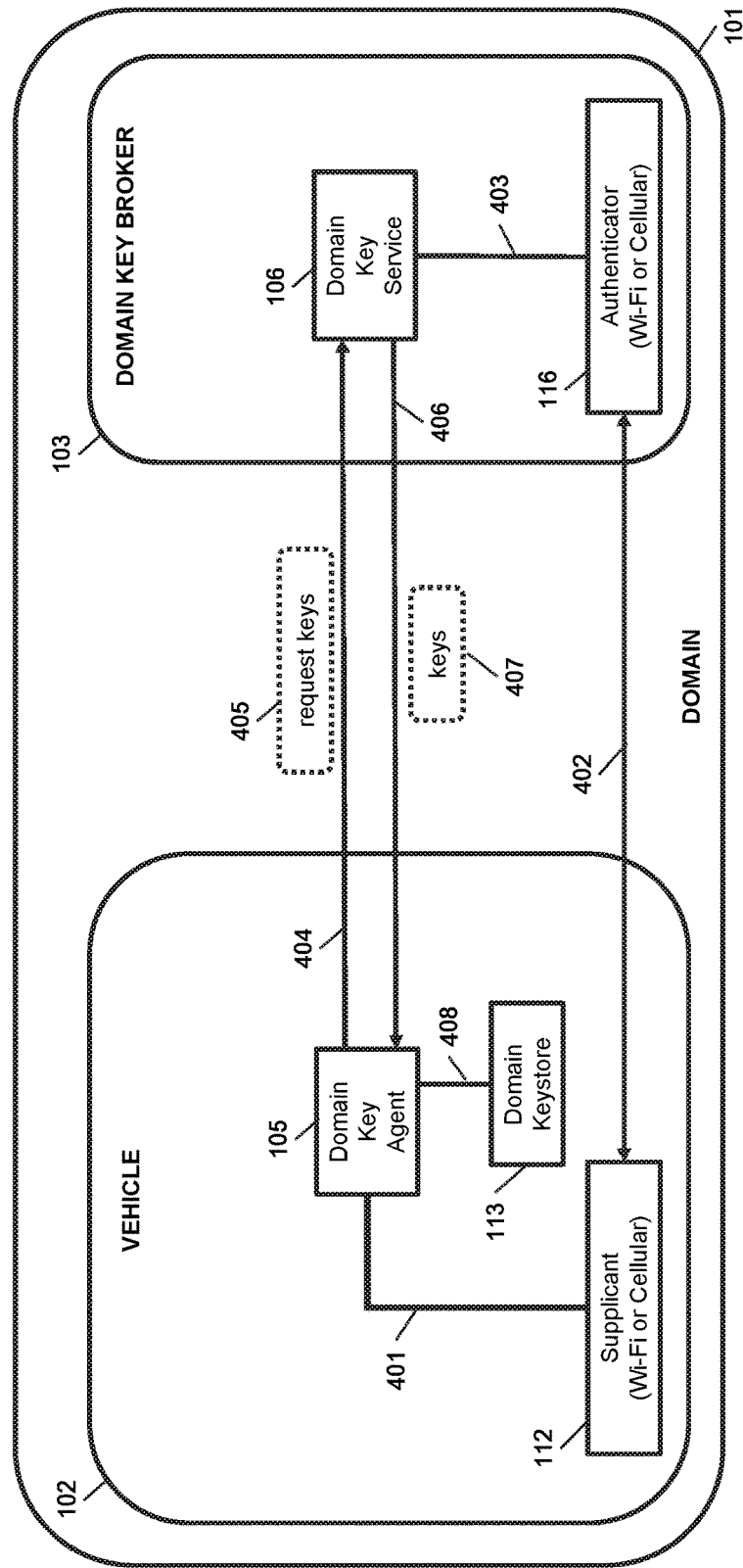
FIG. 4 is a schematic diagram illustrating a workflow for key establishment between a domain key agent and a domain key service of a domain key broker in accordance with various exemplary embodiments of the disclosed system.

Referring to FIG. 3 and FIG. 4, the workflow to discover a domain based on Wi-Fi or cellular signal strength and SSID of the network, authenticate in the domain, and dynamically request a group public key, member certificate and member private key is illustrated. At step 401, the expiry of the member certificate for the domain 101 or a newly discovered domain triggers an authentication ceremony. At step 402 the supplicant 112 initiates an authentication ceremony with authenticator 116 on the domain key broker 103. At step 403, the authenticator 116 verifies the authentication artifacts of vehicle 102 such as for example the vehicle unique identity and vehicle certificate with proof of possession of the vehicle private key. At step 404 the domain key agent 105 requests keys 405 for the domain 101 from the domain key service 106 of domain key broker 103. The communications between a domain key agent 105 and domain key service 106 may be configured to occur on a IoT gateway address for the domain 101 associated with the SSID 361, well-known service port and transport protocol such as for example the Transport Layer Security (TLS) or Datagram TLS (DTLS). At step 406, the domain key service 106 issues keys 407 to the domain key agent 105 on vehicle 102. At step 408, the keys are stored in the domain keystore 113.

In yet another exemplary embodiment of the disclosed system, instead of a group public key and a member private key for the domain, the domain key factory service 107, the domain key service 106, and the domain key agent 105 may exchange symmetric pre-shared secrets such as for example a Key Encryption Key (KEK) and a Traffic Encryption Key (TEK) for the domain as specified in the Group Domain of Interpretation (GDOI) standards described in Request for Comments (RFC) 3547 and 6407 (published by The Internet Society, Network Working Group).

Figure 5:
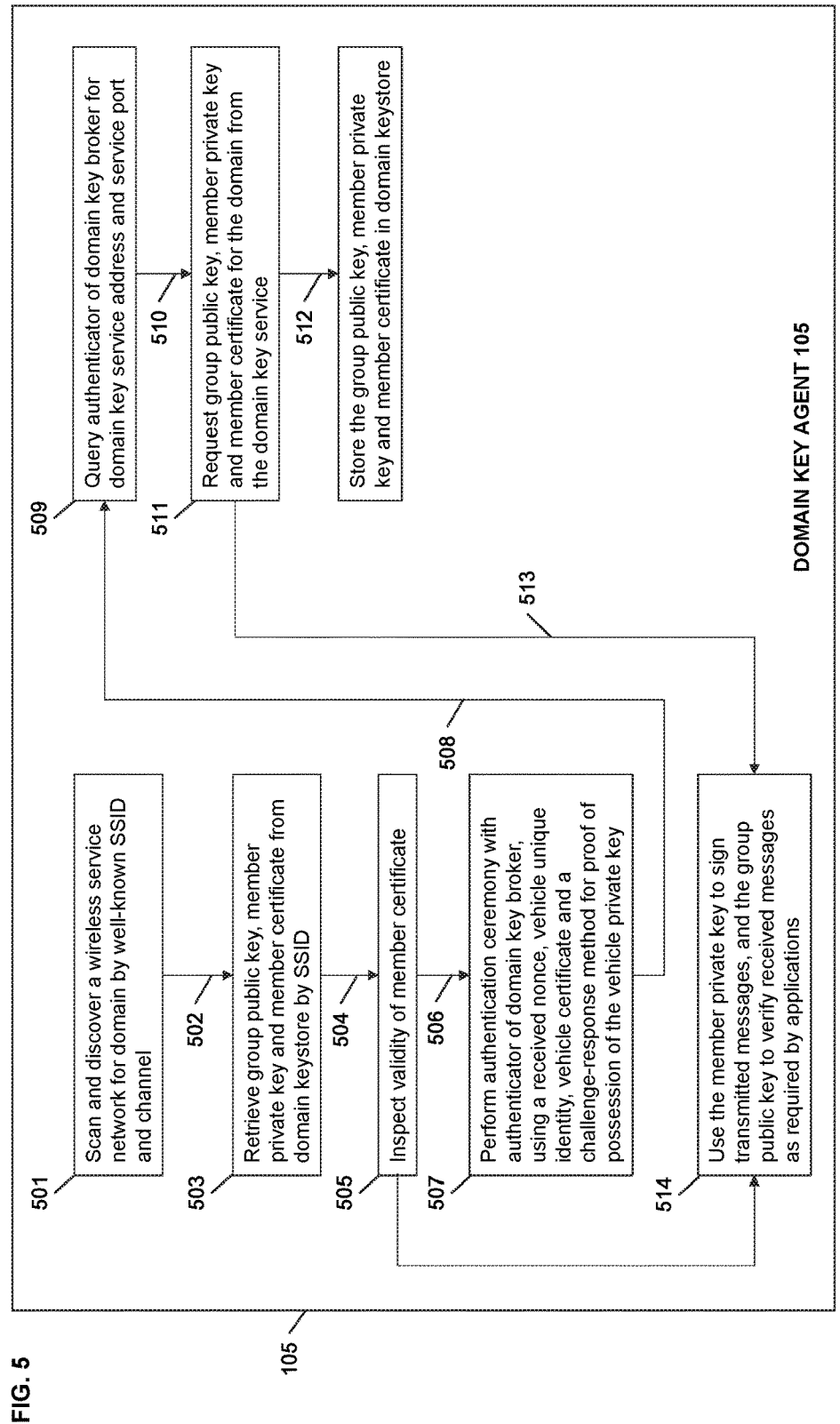
FIG. 5 is a schematic diagram illustrating a workflow for keys and certificate retrieval by a domain key agent in accordance with various exemplary embodiments of the disclosed system.

Referring to FIG. 5, a workflow for keys and certificate retrieval by a domain key agent, such as the domain key agent 105, is illustrated. At step 501 the domain key agent 105 may initiate a scan to discover a wireless service network for the domain by a SSID and channel for the domain. The SSID may be based on, as an example, geo-location, city or zip code. At step 502, the discovered SSID may be used to connect to the wireless network for the domain. At step 503, the domain key agent 105 may retrieve a registered group public key, a member private key and a member certificate from the domain keystore 113 by SSID. At step 504 the domain key agent 105 has either retrieved the registration dataset for the SSID from the domain keystore 113 or determined that an authentication ceremony is required to request the registration dataset from the domain key service 106 on the domain key broker 103.

At step 505, the member certificate retrieved from the domain keystore may be inspected for validity status (e.g. expired, revoked). At step 514, the domain key agent 105 may use the member private key to sign transmitted messages, and the group public key to verify received messages as required by applications 108, 118, 109, 110, 111 on the vehicle 102. At step 507, the domain key agent 105 may perform an authentication ceremony with the wireless authenticator of the domain key broker 103, using a received nonce, vehicle unique identity, vehicle certificate and a challenge-response method for proof of possession of the vehicle private key. In one embodiment, the challenge encrypted using the vehicle public key in the received vehicle certificate by the wireless authenticator 116 on the domain key broker 103 must be decrypted using the vehicle private key on the vehicle 102 to generate a response to the wireless authenticator 116.

At step 508, the vehicle 102 may be authenticated for the domain by the domain key broker 103. At step 509, the domain key agent 105 may query the wireless authenticator 113 of the domain key broker 103 for the domain key service address and service port. At step 510, the domain key agent 105 may establish a secure connection with the domain key broker 103 for the domain. At step 511, the domain key agent 105 may request the group public key, the member private key and the member certificate for the domain from the domain key service. At step 512, the vehicle 102 may be registered in the domain and the registration dataset may be sent to the domain key agent 105 on the vehicle 102. At step 513 the domain key agent may store the group public key, the member private key and the member certificate in the domain keystore 113.

Figure 6:
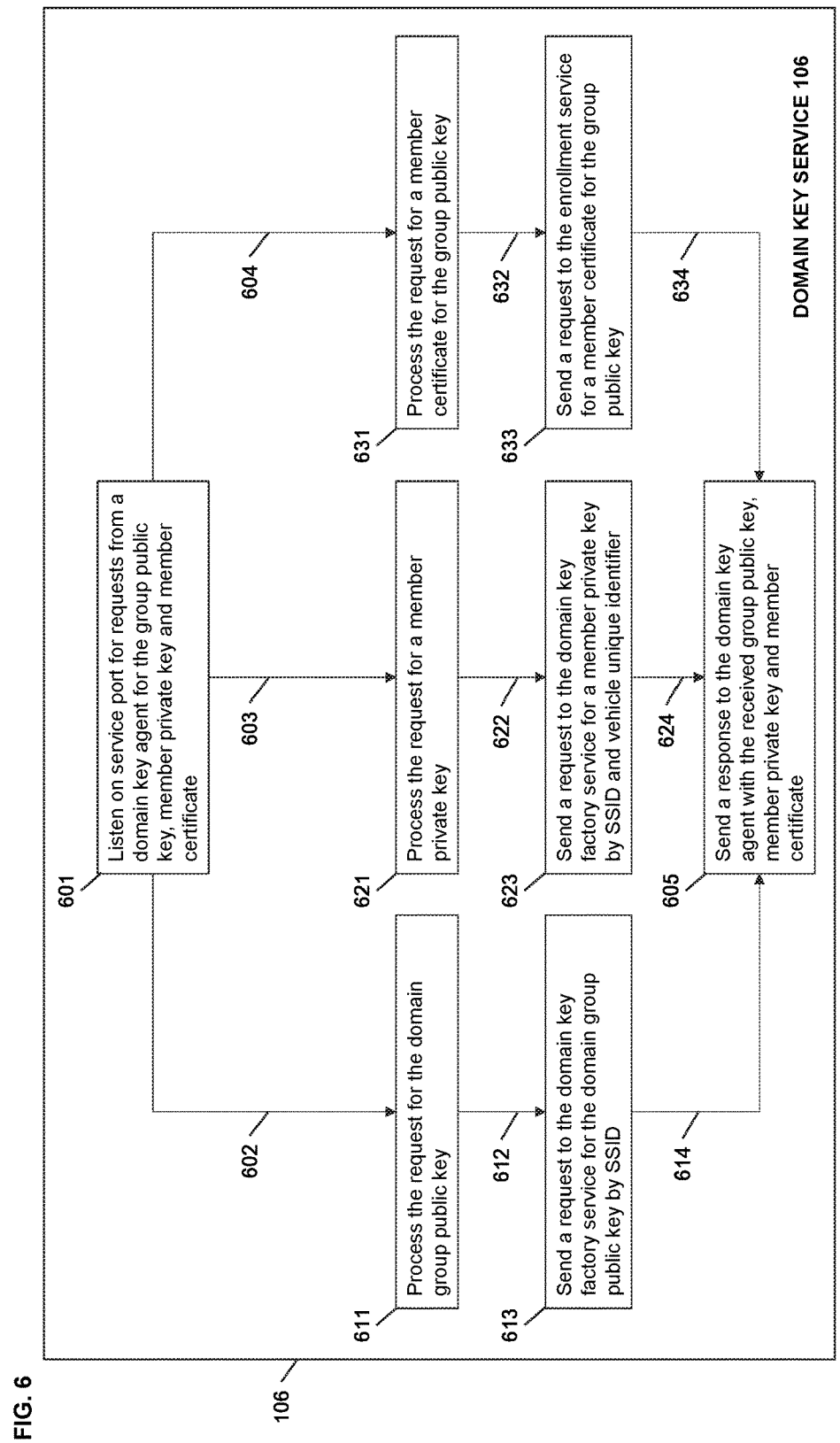
FIG. 6 is a schematic diagram illustrating a workflow for keys and certificate generation by a domain key service in accordance with various exemplary embodiments of the disclosed system.

Referring to FIG. 6, a workflow for keys and certificate generation by a domain key service, such as the domain key service 106, is illustrated. At step 601 the domain key service 106 on the domain key broker 103 may listen on a service port for registration requests from a domain key agent 105 for a group public key, a member private key and a member certificate for the domain. At steps 602, 603 and 604 the registration request may be routed to appropriate request handlers. At step 611, a request may be processed for a domain group public key. At step 612 the request may be prepared for the domain group public key, and at step 613 the request may be sent to the domain key factory service 107 on the domain key distribution center 104 for the domain group public key by SSID. At step 614 a response from the domain key factory service 107 may be provided to prepare an aggregate response to the domain key agent at step 605.

At step 621, a request may be processed for a domain member private key. At step 622 the request may be prepared for the domain member private key, and at step 623 the request may be sent to the domain key factory service 107 on the domain key distribution center 104 for the domain member private key by SSID. At step 624 a response from the domain key factory service may be provided to prepare an aggregate response to the domain key agent at step 605.

At step 631, a request may be processed for a domain member certificate. At step 632 the request may be prepared for the domain member certificate, and at step 633 the request may be sent to the enrollment service 144 on the enrollment server 142 for the domain member certificate. At step 634 a response from the enrollment service may be provided to prepare an aggregate response to the domain key agent at step 605. At step 605 the domain key service may send a response to the domain key agent with the domain group public key, the domain member private key and the domain member certificate.

Figure 7:
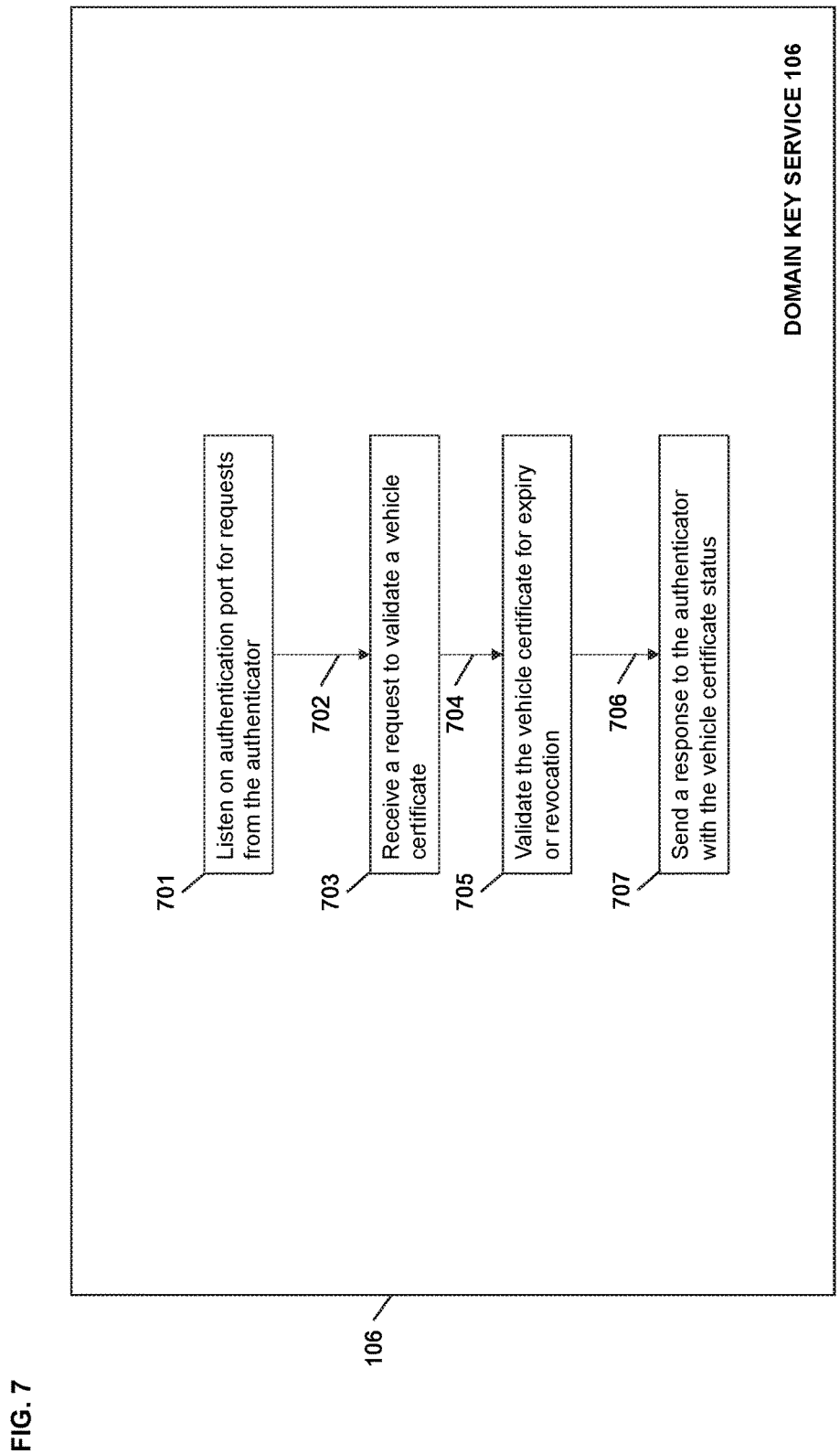
FIG. 7 is a schematic diagram illustrating a workflow for vehicle certificate validation by a domain key service in accordance with various exemplary embodiments of the disclosed system.

Referring to FIG. 7, a workflow for vehicle certificate validation by a domain key service, such as the domain key service 106, is illustrated. At step 701 the domain key service on the domain key broker 103 may listen on an authentication port for authentication requests from the wireless authenticator 116. At step 702, the wireless authenticator 116 may send an authentication request. At step 703, the domain key service 106 may receive the authentication request to validate a vehicle certificate. At step 704, the domain key service may verify the certificate expiry status, and at step 705 may verify, using an Online Certificate Status Protocol (OCSP) responder or using a certificate revocation list (CRL), a revocation status of the certificate. At step 707 the domain key service may send a response to the wireless authenticator 116 with a vehicle certificate status.

Figure 8:
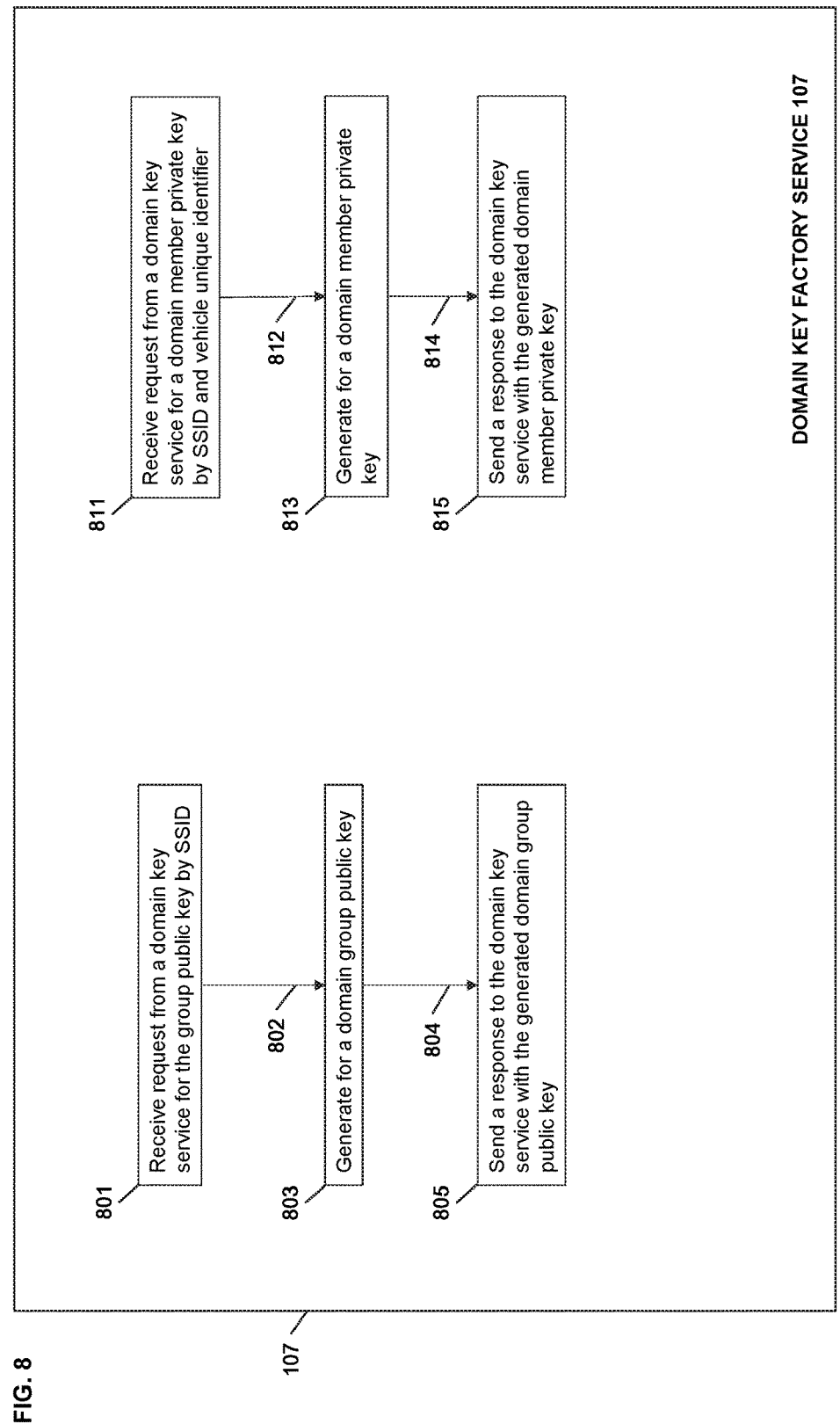
FIG. 8 is a schematic diagram illustrating a workflow for group public key and member private key generation by a domain key factory service in accordance with various exemplary embodiments of the disclosed system.

Referring to FIG. 8, a workflow for group public key and member private key generation by a domain key factory service, such as the domain key factory service 107, is illustrated. At step 801 the domain key factory service 107 on the domain key distribution center 104 may receive a request from a domain key service 106 for the group public key by SS ID. At step 802, the request may be processed to determine whether a group public key for the domain already exists and at step 803 a domain group public key may be generated. At step 804, a response message may be prepared and at step 805 the response may be sent to the domain key service 106 with the generated domain group public key.

At step 811, the domain key factory service 107 on the domain key distribution center 104 may receive a request from a domain key service 106 for a member private key by SSID and a vehicle unique identifier. At step 812 the request may be processed to determine whether the member private key for the vehicle unique identifier already exists and at step 813 a domain member private key may be generated. At step 814, a response message may be prepared and at step 815 the response may be sent to the domain key service 106 with the generated domain member private key. In one embodiment, the response message at step 814 may comprise an error message to indicate that a domain member private key was already generated for the vehicle unique identifier. Such a security countermeasure may prevent abuse of a cloned vehicle unique identifier.

Figure 9:
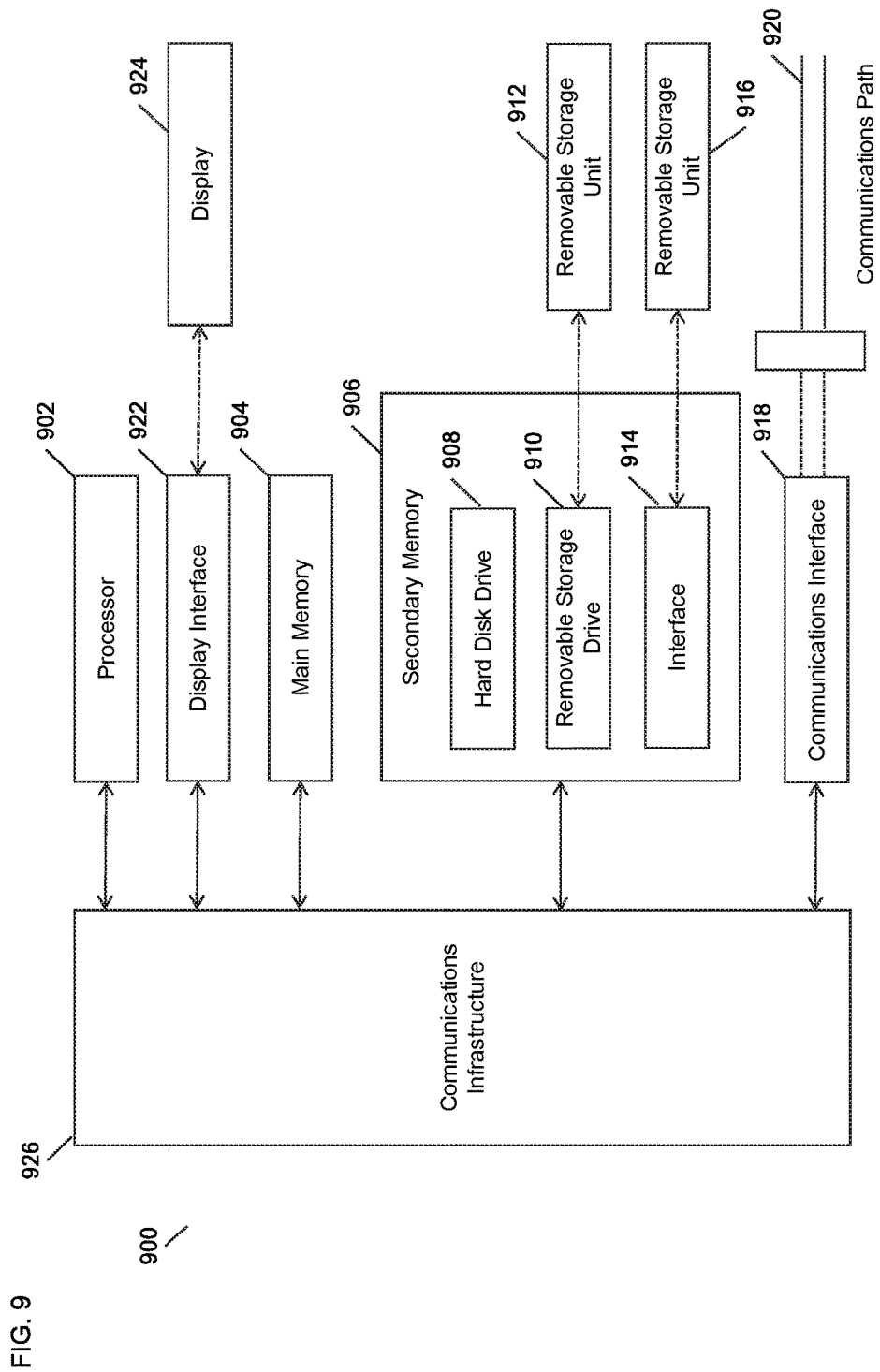
FIG. 9 is a diagram of an exemplary computer system in which embodiments of the method of device identification, discovery, enrollment and registration can be implemented.

FIG. 9 illustrates an exemplary computer system 900 in which embodiments of the present disclosure, or portions thereof, may be implemented as computer-readable code. For example, the network systems and architectures disclosed here (the domain key agent 105, the domain keystore 113, the domain key service 106, the domain key factory service 107, the enrollment service 144, the domain key broker 103, the domain key distribution center 104, etc.) can be implemented in computer system 900 using hardware, software, firmware, non-transitory computer readable media having instructions stored thereon, or a combination thereof and may be implemented in one or more computer systems or other processing systems. Hardware, software executed on hardware, or any combination of such may embody the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the disclosure are described in terms of this example computer system 900. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 902 may be a special purpose or a general-purpose processor device. As will be appreciated by persons skilled in the relevant art, processor device 902 may also be a single processor in a multi-core/multiprocessor system, such system operating alone, or in a cluster of computing devices operating in a cluster or server farm. Processor device 902 is connected to a communication infrastructure 926, for example, a bus, message queue, network, or multi-core message-passing scheme.

The computer system 900 also includes a main memory 904, for example, random access memory (RAM) or flash memory, and may include a secondary memory 906. Secondary memory 906 may include, for example, a hard disk drive 908, removable storage drive 910. Removable storage drive 910 may be a floppy disk drive, a magnetic tape drive, an optical disk drive, a flash memory, or the like.

The removable storage drive 912 reads from and/or writes to a removable storage unit 912 in a well-known manner. Removable storage unit 912 may be a floppy disk, magnetic tape, optical disk, etc. which is read by and written to by removable storage drive 910. As will be appreciated by persons skilled in the relevant art, removable storage unit 912 includes a non-transitory computer usable storage medium having stored therein computer software and/or data.

In alternative implementations, secondary memory 906 may include other similar means for allowing computer programs or other instructions to be loaded into computer system 900. Such means may include, for example, a removable storage unit 916 and an interface 914. Examples of such means may include a program cartridge and cartridge interface (such as that found in video game devices), a removable memory chip (such as an EPROM, or PROM) and associated socket, and other removable storage units 916 and interfaces 914 which allow software and data to be transferred from the removable storage unit 916 to computer system 900.

The computer system 900 may also include a communications interface 918. Communications interface 918 allows software and data to be transferred between computer system 900 and external devices. Communications interface 918 may include a modem, a network interface (such as an Ethernet card), a communications port, a PCMCIA slot and card, or the like. Software and data transferred via communications interface 918 may be in the form of signals, which may be electronic, electromagnetic, optical, or other signals capable of being received by communications interface 918. These signals may be provided to communications interface 918 via a communications path 920. Communications path 920 carries signals and may be implemented using wire or cable, fiber optics, a phone line, a cellular phone link, an RF link or other communications channels.

The computer system 900 may also include a computer display 924 and a display interface 922. According to embodiments, the display used to display the GUIs and dashboards shown in FIGS. 1-8 described above may be the computer display 924, and the console interface may be display interface 922.

In this document, the terms "computer program medium," "non-transitory computer readable medium," and "computer usable medium" are used to generally refer to media such as removable storage unit 912, removable storage unit 916, and a hard disk installed in hard disk drive 908. Computer program medium and computer usable medium can also refer to memories, such as main memory 904 and secondary memory 906, which can be memory semiconductors (e.g., DRAMs, etc.). These computer program products are means for providing software to computer system 900.

Computer programs (also called computer control logic) are stored in main memory 904 and/or secondary memory 906. Computer programs may also be received via communications interface 918. Such computer programs, when executed, enable computer system 900 to implement the present disclosure as discussed herein. In particular, the computer programs, when executed, enable processor device 902 to implement the processes of the present disclosure, such as the stages in the methods illustrated by the flowcharts in FIGS. 1-8, discussed above. Accordingly, such computer programs represent controllers of the computer system 900. Where the present disclosure is implemented using software, the software may be stored in a computer program product and loaded into computer system 900 using removable storage drive 912, interface 914, and hard disk drive 908, or communications interface 918.

Embodiments of the disclosure also may be directed to computer program products comprising software stored on any computer useable medium. Such software, when executed in one or more data processing device, causes a data processing device(s) to operate as described herein.

Embodiments of the disclosure employ any suitable computer useable or readable medium. Examples of computer useable mediums include, but are not limited to, primary storage devices (e.g., any type of random access memory, etc.), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Although the present disclosure is illustrated and described herein with reference to specific embodiments, the disclosure is not intended to be limited to the details shown. Rather, various modifications may be made in the details within the scope and range equivalents of the claims and without departing from the disclosure.

What is claimed is:

1. A method for secure message exchanges between vehicles in an autonomous domain using i) a domain key agent, a wireless supplicant, and a domain keystore at a first and second vehicle, ii) a domain key service and a wireless authenticator at a domain key broker, iii) a domain key factory service at a remote domain key distribution center, and iv) an enrollment service at a remote enrollment server, the method comprising:

scanning, by the wireless supplicant on each the first and second vehicle, a wireless network for the autonomous domain by a service set identifier (SSID) and channel for the autonomous domain;

retrieving, by the domain key agent on each the first and second vehicle, a group public key, a member private key, and a member certificate from the domain keystore for the SSID;

discovering, by the domain key agent on each the first and second vehicle, the wireless authenticator on the domain key broker;

authenticating each the first and second vehicle, by the domain key agent on each the first and second vehicle respectively, with the wireless authenticator on the domain key broker;

listening, on an authentication port by the domain key service for authentication requests from the wireless authenticator on the domain key broker to validate a vehicle certificate;

querying, by the domain key agent on each the first and second vehicle from the wireless authenticator on the domain key broker, a domain key service address and service port for the autonomous domain;

listening, on the service port by the domain key service for registration requests from the domain key agent on each a first and a second vehicle, for the group public key, the member private key and the member certificate;

processing, by the domain key service the received registration request, and sending a group public key and a member private key request to the domain key factory service for generation of a domain group public key and a domain member private key associated with a vehicle unique identifier of each the first and second vehicles;

processing, by the domain key service the received registration request, and sending an enrollment request to the enrollment service for a member certificate associated with the vehicle unique identifier of each the first and second vehicles;

receiving, by the domain key agent on each the first vehicle and second vehicle from the domain key service, the domain group public key, the domain member private key and the member certificate associated with the vehicle unique identifier in response to the registration request;

sending, by the domain key agent on at least one of the first and second registered vehicles, a message signed using the domain member private key to another registered vehicle in the domain; and verifying, by the domain key agent on at least one of the first and second registered vehicles, a received signed message from the other registered vehicle within the domain using the domain group public key.

2. The method of claim 1, wherein the wireless supplicant on the first vehicle comprises a Wi-Fi or cellular supplicant, and the wireless authenticator on the domain key broker comprises a Wi-Fi or cellular access point.

3. The method of claim 1, wherein the domain keystore of the domain key agent comprises at least one of a table of cached records associated to a SSID, a domain type, a group public key, a member private key, a member certificate, and a timestamp.

4. The method of claim 3, wherein the domain key agent uses the group public key, the member private key, and the member certificate based on the dynamically discovered domain SSID for the first vehicle.

* * * * *